Figure 1:
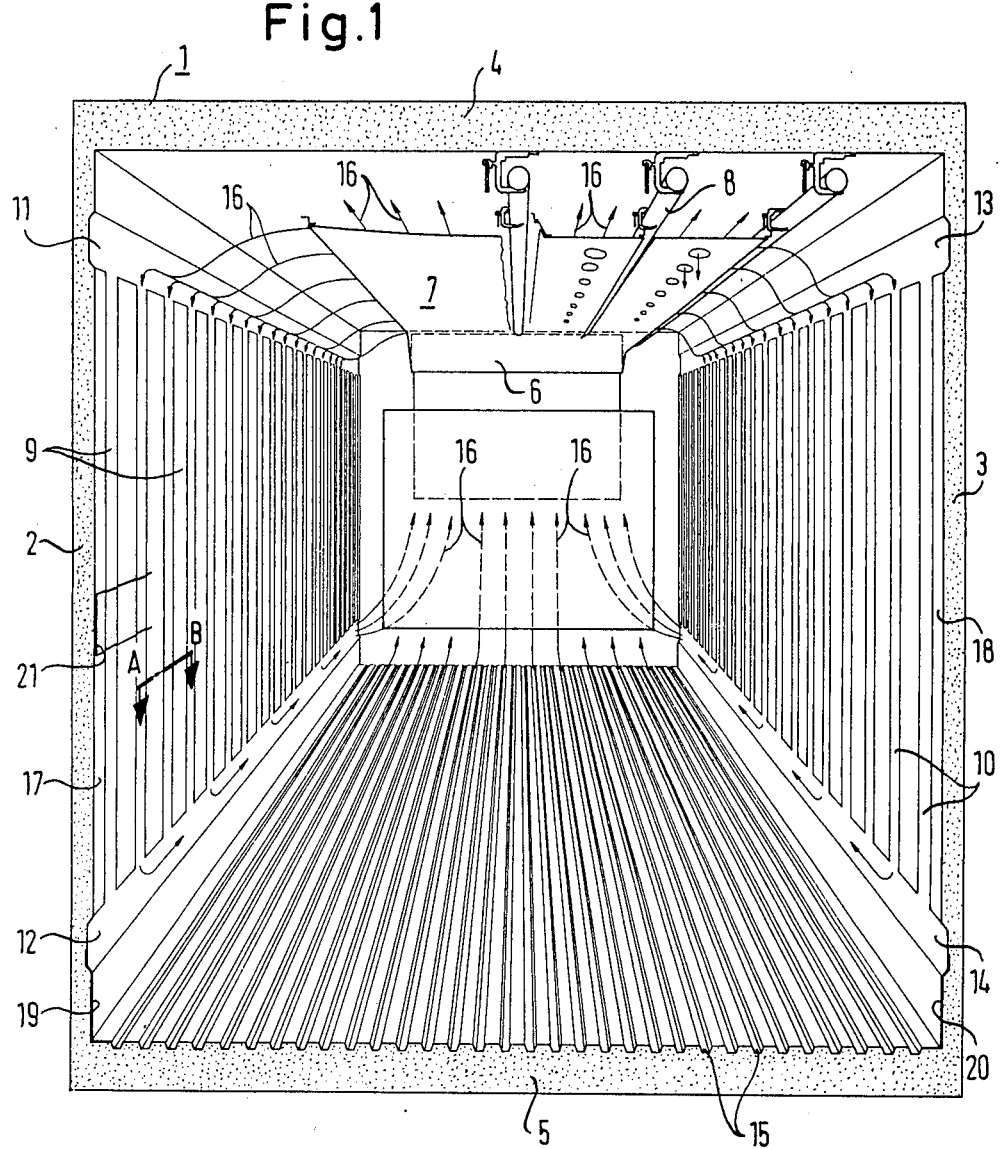

United States Patent [19]

Strobel et al.

[11] Patent Number: 4,800,733
[45] Date of Patent: Jan. 31, 1989

[54] REFRIGERATION SYSTEM FOR FREIGHT VEHICLES

[75] Inventors: Georg Strobel, Ulm-Wiblingen; Walter Häge, Ulm, both of Fed. Rep. of Germany

[73] Assignee: F. X. Kogel GmbH & Co., Ulm, Fed. Rep. of Germany

[21] Appl. No.: 119,768

[22] Filed: Nov. 12, 1987

[30] Foreign Application Priority Data

Nov. 12, 1986 [DE] Fed. Rep. of Germany ... 8630333[U]

[51] Int. Cl.$^4$ .............................................. B60H 1/32
[52] U.S. Cl. ........................................... 62/239; 98/6
[58] Field of Search ....................... 62/239, 407; 98/6

[56] References Cited

U.S. PATENT DOCUMENTS

| 3,206,946 | 9/1965 | Lindersmith et al. | 98/6 X |
|---|---|---|---|
| 3,311,042 | 3/1967 | Severson | 98/6 |
| 3,335,653 | 8/1967 | Heimann | 62/239 X |
| 3,362,179 | 1/1968 | Kirkpatrick | 62/239 X |
| 4,593,536 | 6/1986 | Fink et al. | 62/239 |

*Primary Examiner*—William E. Tapolcai
*Attorney, Agent, or Firm*—Sughrue, Mion, Zinn, Macpeak & Seas

[57] ABSTRACT

A refrigeration system for freight vehicles having inwardly open profiling for air ducting in the floor, the side walls and the doors, the profiling in the region of the vertical walls and doors being formed of vertically extending grooves or channels. In order to ensure uniform supply of cooling air to the grooves or channels of the vertically extending profiling and to ensure uniform discharge of the cooling air in the region of the lower ends of the grooves or channels independently of the loading condition, each of the side walls has at least one lower, preferably one lower and one upper, substantially horizontally extending air ducting channel, the lower air ducting channel being arranged at a spacing from the floor, and the vertical profiling discharges into the air ducting channels.

8 Claims, 1 Drawing Sheet

REFRIGERATION SYSTEM FOR FREIGHT VEHICLES

The invention relates to a refrigeration system for freight vehicles comprising inwardly open profiling for air ducting in the floor, the side walls and the doors, the profiling being in the form of vertically extending grooves or channels in the region of the vertical walls and doors Relatively stringent requirements are now placed on refrigeration systems. In particular, it must be ensured that effective air circulation is provided in order to cool perishable foodstuffs at all points of the loading space, in particular however in the region of the outer walls of the system Difficulties can however be created if the circulation is disturbed as a result of extremely dense loading of the refrigeration system, above all because as a result of the prevailing regulations for loading space sizes, vehicle widths, thickness of insulation and as a result of standardised palettes, the loading space is actually exploited up to the last millimetre and the cooling air has to find its way, as it were, through the residual gaps. Dense loading also however leads to the result that hand carts are brought very close to the side walls, as a result of which damage to the side walls and in particular to their profiled regions and the insulation cannot be prevented.

An object of the present invention is to develop further a refrigeration system of the type described in the introduction in such manner that even with a dense loading sufficient air circulation and thus optimum cooling is ensured and the danger of damage to the profiled regions necessary for the circulation is reduced.

This object is achieved according to the invention in that each of the side walls has at least one lower, and preferably a lower and an upper, substantially horizontally extending groove-like air ducting channel, the lower air ducting channel being arranged at a distance above the floor, and in that the vertical profiling opens into the air ducting channels.

The invention is based on the concept of taking steps which on the one hand ensure uniform supply of cooling air through the grooves or channels of the vertically extending profiling and on the other hand ensure uniform discharge of the cooling air in the region of the lower end of the grooves or channels independently of the loading condition. For this purpose, according to the invention, on the respective ends of the grooves or channels of the vertically extending profiling the substantially horizontally extending upper and lower groove-like air ducting channels are provided, which on the one hand ensure uniform charging with cooling air (upper air ducting channels) and on the other hand enable uniform discharge of the cooling air in the region of the lower ends of the grooves or channels (lower air ducting channels).

As a result of this forced ducting of the cooling air, moreover in the region of the grooves or channels a certain ejector effect is achieved which acts on the regions adjoining the grooves or channels and leads to a uniform continuously downwardly flowing cooling air curtain in the region of the inner surfaces of the side walls.

As a result of the arrangement according to the invention of the air ducting channels connected to the vertical profiling, in a refrigeration system of the type described in the introduction, exactly defined ducting of cooling air is ensured irrespective of any possible residual gaps, the ducting being uninfluenced by extremely dense loading. Optimal flow around the loaded goods is therefore ensured even in the event of unfavourably dense loading. As a result of these improved flow conditions, the flow temperature of the refrigeration apparatus can be increased, whereby lower energy requirements for the cooling apparatus result. Also, the cooling apparatus can operate repeatedly in a partial load condition as a result of which noise reduction, further energy saving and also reduced impact on the environment are achieved.

Because, on the one hand, the exterior width of the refrigeration system is limited by law to 2.5 m plus permitted tolerance, and on the other hand because of the practical requirement for an unobstructed width of the interior space which is as large as possible, the side walls of the refrigeration system always have a smaller wall thickness than the ceiling and the floor. This means that the side walls necessarily have a lower K value than the ceiling and the floor for which reason effective and uniform cooling is necessary in this region. The air ducting according to the invention takes account of this circumstance.

Particularly favourable air ducting is achieved with groove-like air ducting channels which have a trapezium shaped cross-section Such a configuration is also of an advantage from the production standpoint.

As a result of the feature that the lower air ducting channel is arranged at a spacing from the floor, the danger of damage to the profiling necessary for the circulation of the cooling air is considerably reduce since according to the invention such damage caused by hand carts occurs in the lower region of the side walls directly adjoining the floor. A particularly advantage further development with reference to the prevention of damage during loading is however achieved if each side wall is provided with guard surfaces between the surface of the floor and the lower edge of the lower air ducting channel, which guard surfaces extend over the entire length of the system and are raised relative to the inner surface of the side walls.

By the term "raised" it should be understood that the guard surfaces extend further into the interior of the refrigeration space than the inner surface of the side walls. In this manner, it is true that the unobstructed interior width of the refrigeration construction is slightly reduced in the region of the guard surfaces. Experiments have however shown that even a construction of the guard surface raised by a few millimetres leads to a surprising reduction of the danger of damage.

Fundamentally, the guard surfaces can be constructed of individual sheets. Particularly advantageous results have however been achieved where the guard surfaces form a continuous surface in the vertical direction whose plane extends parallel to the plane of the inner surface.

In a preferred exemplary embodiment, the arrangement is so constructed that the plane of the guard surface is spaced from the plane of the inner surface of the side walls by a distance which corresponds to approximately half the depth of the adjoining lower air ducting channel In order to prevent obstruction of the cooling air, it is advantageous if the vertical profiling merges smoothly into the upper and lower air ducting channels. For improving the air ducting, it may moreover be provided that the width of the lower and upper air ducting channels is larger than the width of the grooves or channels of the vertical profiling.

It is advantageous to reinforce the guard surfaces This reinforcement can be achieved in various ways. Thus, the guard surfaces or their reinforcement can consist of metal, such as for example aluminium or stainless steel. If the guard surfaces are constructed of polyester, it is advantageous to provide a compression resistant material layer beneath the cover layer.

By means of the raised guard surface between the surface of the floor and the lower edge of the lower air ducting channel, the danger of damage to the side walls is considerably reduced Still further reduction of the danger of damage is however achieved if in the region of the inner surface approximately at half the height of the side walls there are arranged horizontally extending rails whose inwardly facing surfaces are in addition constructed as guard surfaces. These horizontally extending rails can in addition serve as a support for suspendable intermediate floor carriers, known per se.

The refrigeration apparatus is usually arranged in the region of the front wall on the exterior side of the refrigeration system In this event, in the front wall are provided apertures and channels through which on the one hand the cooling air is supplied into the region of the ceiling of the refrigeration construction and on the other hand the "used" cooling air is fed again to the cooling apparatus for recooling. In this connection, in most cases for forming a cooling air gap a wall or plate is provided at a spacing from the inner surface of the front wall in order to prevent that loading being effected too close to the front wall of the refrigeration space. According to an advantageous further development of the invention, the lower air ducting channels are constructed in such manner that they discharge into this return cooling air gap.

The grooves or channels of the vertical profiling have so far been described as extending only exactly perpendicularly. In order to improve the cooling air ducting, it can however be advantageous within the scope of the invention to arrange the grooves or channels of the profiling at a slant, i.e. not exactly vertically.

As already explained, by means of the raised arrangement of guard surfaces the distance between the loaded goods and the inner surface of the side walls is slightly increased. In this way, in the event of loading which is slightly off-centre, contact with the side wall is either avoided or is "attenuated" so that even in such cases without unfavourable effect upon the air circulation the danger of damage to the profiling is reduced In the following for further explanation and better understanding an exemplary embodiment of the invention is described and explained in more detail with reference to the accompanying drawings, in which FIG. 1 shows a perspective view of the interior space of a refrigeration system constructed according to the invention viewed from behind in a direction of the front wall, and FIG. 2 shows a section along the plane A-B of FIG. 1.

Figure 2:
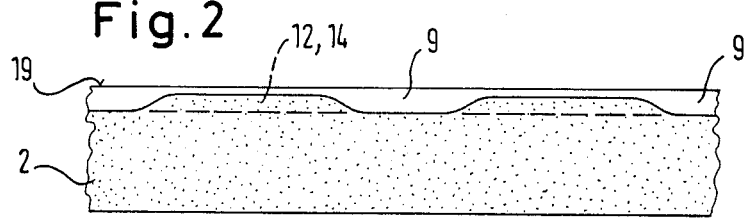

As may be seen from FIG. 1, the refrigeration system 1 consists of insulated side walls 2,3, an insulated roof 4 and a similarly insulated floor 5. Reference numeral 6 designates the end member of cooling apparatus. At the left of the roof 4 is indicated a simple air ducting channel 7 and on the right hand side another variation of an air ducting channel in combination with a meat suspension device 8.

The side walls 2,3 are provided with vertical profiling in the form of grooves or channels 9,10, which discharge into horizontally extending air ducting channels 11,12,13 and 14, in such manner that smooth transition is provided The floor 5 has the usual profiling 15.

In FIG. 1 it can be clearly seen that the air ducting channels 11 to 14 are substantially larger in cross-section than the vertical profiling 9,10; moreover, the smooth transition can be clearly recognised. In this connection, reference should also be made in FIG. 2 in which the corresponding reference numerals are entered. Arrows 16 in FIG. 1 show the already mentioned improved ducting of cooling air and air circulation.

An important feature of the invention is represented by the surfaces 19,20 raised relative to the side surfaces 17,18 of the side walls 2,3, and extending from the front to the rear, which can be designated as guard surfaces or guard boards These prevent damage to the profiling 9,10 and the inner sides 17,18 of the side walls 2,3 during loading As schematically indicated, the surfaces 19,20, which may also be regarded as slide surfaces, are thicker than the remaining wall components so they can withstand rough handling. It may furthermore be seen that their height is larger than the width of the channels 12,14 in order to prevent damage caused by goods loaded at a position which is slightly too high On the left side of FIG. 1 is indicated an upright surface 21 in the form of a rail, which is arranged on both sides and can serve as a raised further guard surface. Moreover, hooks for intermediate floor carriers can be suspended in the region of the vertical profiling 9,10.

We claim:

1. A refrigeration system for freight vehicles comprising:
    a roof, a floor, side walls and cooling means at one end thereof, said side walls and said floor being provided with inwardly open profiling for air ducting in the floor and side walls, said profiling being formed of vertically extending channels on the side walls with each side wall having upper and lower horizontally extending air ducting channels spaced from the roof and floor at respective ends of said vertically extending air ducting channels and a guard surface formed on each said wall between the floor and the lower edge of the lower horizontally disposed air ducting channel, which guard surface extends along the entire length of the vehicle and is raised relative to the inner surface of the side wall.

2. Refrigeration system according to claim 1 wherein said at least one air ducting channel has a trapezoidal cross-section.

3. Refrigeration system according to claim 1 wherein said guard surface forms a continuous surface in the vertical direction whose plane extends parallel to the plane of the inner surface of the side wall.

4. Refrigeration system according to claim 3 wherein the plane of the guard surface is spaced relative to the plane of the inner surface of the side wall by a distance which corresponds approximately to half the depth of the respectively adjoining air ducting channel 5. Refrigeration system according to claim 1 wherein the vertical profiling merges smoothly into the upper and lower air ducting channels 6. Refrigeration system according to claim 1 wherein the width of the lower and upper air ducting channels is larger than the width of the channels of the vertical profiling.

7. Refrigeration system according to claim 1 wherein the guard surfaces consist of stainless steel 8. Refrigeration system according to claim 1 wherein the guard surfaces consist of polyester, and beneath the cover layer of polyester a compression resistant material layer is arranged.

* * * * *